(12) United States Patent
Durfee

(10) Patent No.: US 9,599,145 B2
(45) Date of Patent: Mar. 21, 2017

(54) MAGNETIC CLASP ANIMAL LEASH ASSEMBLY

(71) Applicant: Jason Durfee, Troy, MI (US)

(72) Inventor: Jason Durfee, Troy, MI (US)

( * ) Notice: Subject to any disclaimer, the term of this patent is extended or adjusted under 35 U.S.C. 154(b) by 0 days.

(21) Appl. No.: 14/605,663

(22) Filed: Jan. 26, 2015

(65) Prior Publication Data

US 2016/0215812 A1  Jul. 28, 2016

(51) Int. Cl.
 *F16B 45/02* (2006.01)
 *A01K 27/00* (2006.01)
 *F16B 45/04* (2006.01)

(52) U.S. Cl.
 CPC .......... *F16B 45/025* (2013.01); *A01K 27/003* (2013.01); *F16B 45/04* (2013.01); *Y10T 24/32* (2015.01)

(58) Field of Classification Search
 CPC ... F16B 45/025; A01K 27/003; A01K 27/005; B63B 21/54; F16G 11/10; Y10T 24/45293
 USPC .......................................................... 24/303
 See application file for complete search history.

(56) References Cited

U.S. PATENT DOCUMENTS

| | | | |
|---|---|---|---|
| 3,013,517 A * | 12/1961 | Isham | B63B 21/54 114/221 R |
| 3,264,678 A * | 8/1966 | Parmelee | G02C 5/2209 16/228 |
| 3,910,234 A | 10/1975 | Henson | |
| 3,913,515 A * | 10/1975 | Hernsjo | F16G 11/00 114/221 R |
| 3,952,382 A * | 4/1976 | Vaage | F16B 45/06 24/598.5 |
| 4,404,927 A * | 9/1983 | Woutat | F16G 11/10 119/776 |
| 4,530,310 A * | 7/1985 | Clarke | A01K 27/005 119/776 |
| 4,751,892 A * | 6/1988 | Sechel | B63B 21/00 114/221 R |
| 4,903,638 A * | 2/1990 | Lacey | A01K 27/005 119/776 |
| 5,103,771 A * | 4/1992 | Lee | F16G 11/10 119/776 |
| RE34,351 E | 8/1993 | Lacey | |
| 5,430,914 A * | 7/1995 | Patterson | F16B 45/02 24/598.5 |
| 5,806,468 A * | 9/1998 | Ryder | A01K 27/005 119/776 |

(Continued)

*Primary Examiner* — Robert J Sandy
*Assistant Examiner* — Rowland Do
(74) *Attorney, Agent, or Firm* — Wayne State Law School Patent Clinic

(57) ABSTRACT

A magnetic clasp animal leash assembly for connecting to an animal collar having at least one metallic leash attachment ring defining an aperture. The assembly having a first member and a second member moveable with respect to one another between a closed position and an open position. The two members have an internal surface creating an aperture in a closed state. Outer ends of the two members are spaced from one another creating a clear passage with respect to the internal surface defining the aperture in an opened state. A magnet is located opposite from the clear passage proximate to the internal surface of the aperture. An actuator assembly is engageable with the two members to drive the two members toward the open position.

3 Claims, 4 Drawing Sheets

(56) References Cited

U.S. PATENT DOCUMENTS

| | | | | |
|---|---|---|---|---|
| 5,867,877 A * | 2/1999 | Patterson | ................ | F16G 11/10 24/517 |
| 6,230,663 B1 * | 5/2001 | Welch | ................... | A01K 27/005 119/772 |
| 6,363,876 B1 * | 4/2002 | Blake | ...................... | B63B 22/02 114/221 R |
| 6,374,779 B1 * | 4/2002 | Miller | ................... | A01K 27/005 119/863 |
| 6,382,139 B1 * | 5/2002 | Rhodes | ................ | A01K 27/005 119/776 |
| 6,499,437 B1 | 12/2002 | Sorenson et al. | | |
| 6,629,511 B2 | 10/2003 | DeBien | | |
| 6,654,990 B2 * | 12/2003 | Liu | ...................... | F16B 45/025 24/598.5 |
| 6,955,138 B2 | 10/2005 | DeBien | | |
| 7,367,287 B1 * | 5/2008 | Jones, Jr. | ............. | A01K 27/005 119/798 |
| 7,389,750 B1 | 6/2008 | Rogers et al. | | |
| 7,640,639 B2 | 1/2010 | DeBien | | |
| 7,828,180 B2 * | 11/2010 | Slesar | ........................ | A45F 5/02 119/776 |
| 7,839,248 B2 * | 11/2010 | Fullerton | .................. | F02P 3/02 24/303 |
| 9,211,938 B1 * | 12/2015 | Cardarelli | ............... | B63B 21/04 |
| 2009/0255486 A1 * | 10/2009 | Thompson | ........... | A01K 27/006 119/794 |
| 2011/0315090 A1 * | 12/2011 | Marshall | ............. | A01K 27/005 119/796 |

\* cited by examiner

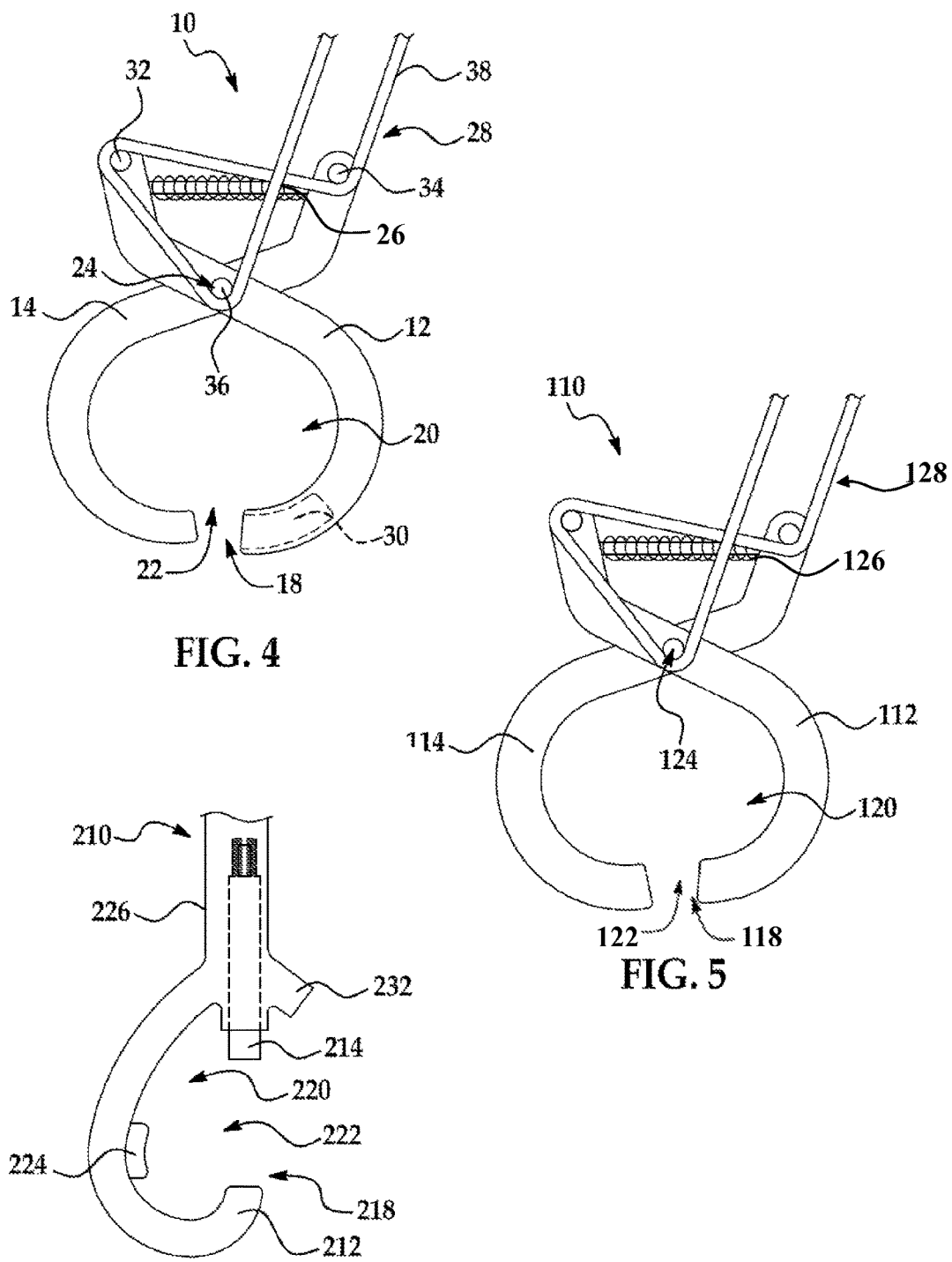

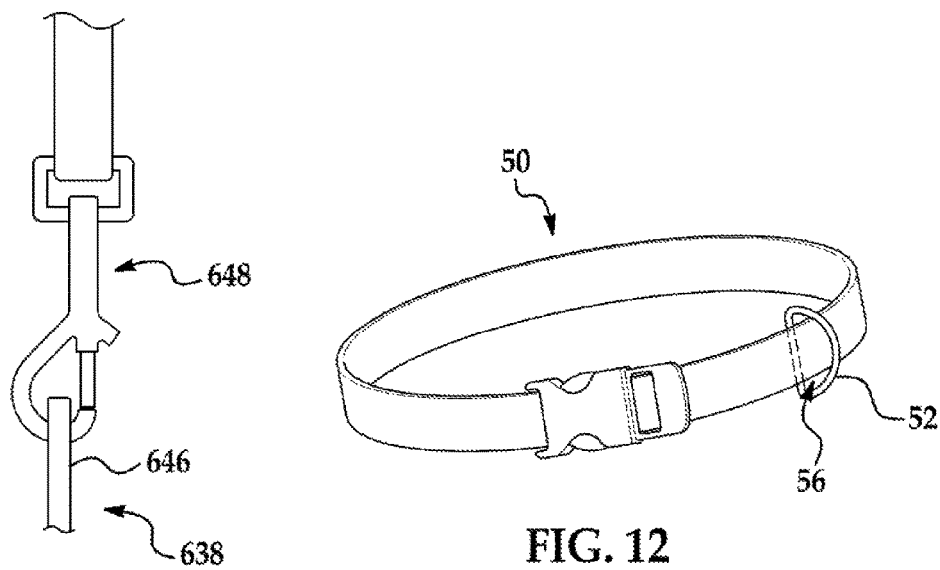
FIG. 11
-- Prior Art --
FIG. 12
-- Prior Art --
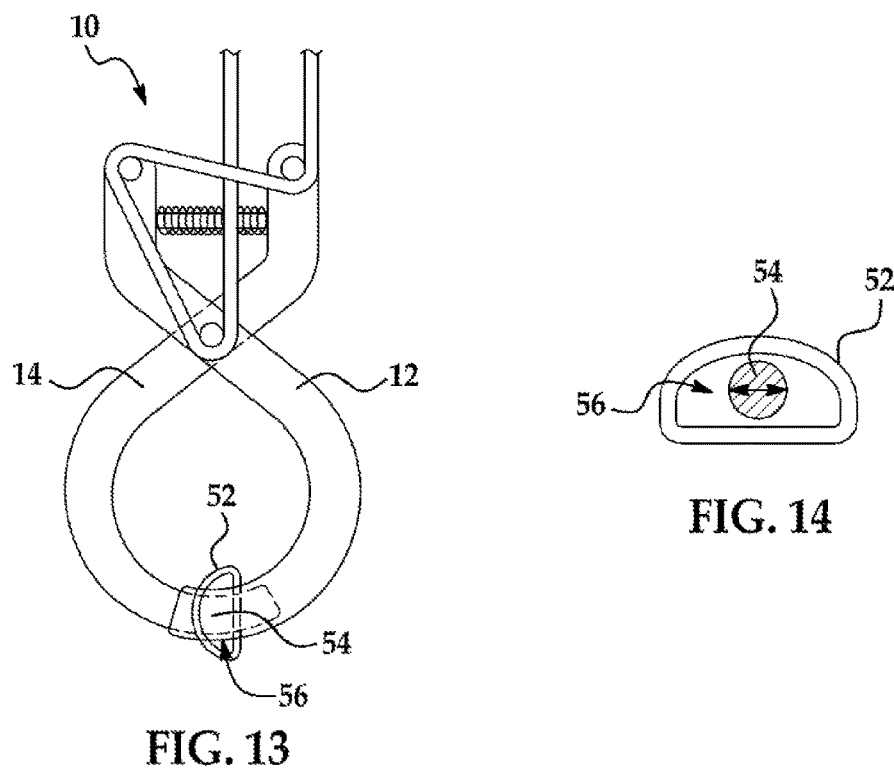
FIG. 13
FIG. 14

MAGNETIC CLASP ANIMAL LEASH ASSEMBLY

FIELD OF INVENTION

This invention relates to devices for attachment of an animal leash to an animal collar leash attachment, more specifically a method or apparatus for hitching or tethering by securing or fastening of an animal using an elongated element to keep the animal within certain bounds or radius, including a quick liberating apparatus for hitched animals, wherein a tether includes an attaching apparatus to an animal halter or collar which is operable at a distance there from to unlock the tether, and more specifically to fasteners including material using magnetism and fasteners requiring manual force to interlock or disengage.

BACKGROUND

Animal leashes are used commonly by animal owners for handling, training, and restraint of animals. While leashes are most commonly used with dogs, leashes are also used in the handling of a variety of animals, including but not limited to: cats, horses, and the catching of wild animals. Leashes are also used for humans, such as toddler leashes to keep children from running astray. Most animal owners use a leash with a snap clasp engageable with a pet collar having a D-shaped ring. The clasp can be cumbersome to use for animal owners with health conditions that can impair or degrade the use of hands to open and close the leash clasp, such as arthritis, stroke, amputees, or other dexterity limitations of the hands. Due to the snap clasp being small and cumbersome to use, the snap clasp can be difficult to both get a leash quickly engaged or disengaged with a collar to take care of the needs of an animal. At times for safety reasons, a handler can desire to quickly release an animal, such as when an animal is becoming too excited or becoming aggressive and a danger to the handler. Under these circumstances, the handler can have difficulty approaching the neck of the animal to release the snap clasp without being put in danger of harm.

Various types of animal leashes are previously known. For example, U.S. Pat. No. 6,499,437 discloses a magnetic connector that includes a first and second connector part, each having a respective magnet. The magnetic connector disclosed automatically aligns the two parts with respect to one another when the two parts of the connector are brought closely together and automatically mechanically interlocks the two parts of the connectors when tension is applied. Tension on the pet leash automatically moves the first connector part to a second position, and thereby automatically mechanically interlocks the first and second connector parts.

U.S. Pat. No. 7,389,750 discloses a leash and collar system having a unique coupling that can be quickly attached and detached with one hand even while the coupling is pulled in tension. The coupling has male and female sections that selectively interconnect. A magnet is disposed within the receptacle at a base of the receptacle. The male section has an internal plunger that selectively moves between a forward position and a rearward position. Locking elements protrude from the male section when the internal plunger element is in the forward position. The locking elements prevent the male section from being retracted out of the receptacle.

U.S. Pat. No. 3,810,234 discloses a quick release dog leash or tether having means remote from the tethered dog for quickly releasing the dog from the tether. In order to attach the leash to a dog wearing the collar, the operator puts his hand in the strap, pulls a ring to retract a bolt. The collar attachment is then placed into the clasp, the ring retracts allowing extension of the bolt, and the leash is secured to the collar.

U.S. Pat. No. 6,629,511 discloses a leash assembly designed to accomplish a quick release or detachment of an animal from a tethered position and/or a quick reattachment into a tethered position. The assembly includes a release structure axially moveable along a length of a lead. A distal end of a release cable is connected to a rotating coupling assembly structured to removably connect a collar, harness, or similar assembly to the distal end of the lead. An activation assembly connects adjacent to the proximal end of the lead and, when selectively positioned, serves to orient the release structure into a disconnection position relative to the coupling assembly, such that the components can be easily released.

U.S. Pat. No. 6,955,138 discloses a retractable leash assembly structured to facilitate quick connection of an animal to a lead interconnected at a proximal end to an activation assembly and to a quick connect coupling assembly at a distal end. The leash assembly includes a release structure disposed in a communicative relation with the coupling assembly structured to removably connect a harness, collar, or similar attachment assembly to the distal end of the lead. The activation assembly, after actuation, transmits a signal to the release structure to dispose the components of the coupling assembly into a release orientation, such that components can be easily disconnected from one another.

U.S. Pat. No. 7,640,639 discloses a quick connect coupling assembly having a first and second component, and a locking assembly structured to retain the components in an attached orientation with one another. The locking assembly includes a plurality of locking elements, each having a locking arm with a locking member mounted to a distal end, wherein the locking members are maintained in an outwardly extending orientation by a biasing mechanism. The biasing mechanism can include magnetic biasing element structures to create a repulsive magnetic force between one another.

U.S. Pat. No. RE 34,351 discloses a remotely detachable animal leash. The jaws of the catch of the leash are latched by a yieldably biased sleeve retractable by a pull cord extending reward to the handle of the leash. When the cord is pulled, the catch mechanism releases from the closed configuration to the open configuration.

SUMMARY

A magnetic clasp animal leash assembly is an improvement over previously known art that requires use of a specialized pair of magnets corresponding to one portion of the magnetic assembly formed as a component located on the collar and another portion of the magnetic assembly formed as a component of the leash. The magnetic clasp animal leash assembly according to the present invention is directed towards a single unit, including a lead of a leash, or adapted to use with an existing lead of a leash. The assembly can include a leash release cable and one or more magnets for purposes of alignment of a clasp with a metal D-shaped ring of a standard animal collar.

The magnetic clasp animal leash assembly provides an ability to connect to an animal collar having at least one metal leash attachment ring. The magnetic clasp animal leash assembly includes a first member and a second member moveable with respect to one another to define an aperture with an internal surface extending between the first and second members, when in a closed state. When in an open state, with outer ends of the first member and second member spaced from one another, a clear passage is defined communicating with the internal surface defining the aperture. The clasp assembly can have a magnet located opposite from the clear passage and proximate to the internal surface of the aperture. The clasp assembly can include a biasing member which urges the first member and the second member normally toward the closed position. An actuator assembly engages with the first and second member to drive the first and second member toward the open position. If a biasing member is present, the actuator assembly can engage with the first and second member to drive the first and second member against the urging of the biasing member toward the open position. The magnet element can be shaped to function as a pivot joint by pivotally connecting the first and second member and allowing movement of the members between the open and closed positions.

The first and second members of the clasp assembly can form the closed position with the first member and the second member having arcuate outer ends overlapping each other to create the aperture, where the overlapping arcuate outer ends can be created with the first member having a tubular aperture extending inwardly from a distal end of complementary size and shape to receive a complementary tubular shaped distal end of the second member. Alternatively, the first and second members of the clasp assembly can form the closed position with the first member and the second member having arcuate outer ends overlapping each other to create the aperture, where the overlapping arcuate outer ends can be created by an exterior surface of the first member overlapping and engaging with a complementarily shaped exterior surface of the second member. The first and second members can also be formed with one member being C-shaped and the other member being a spring biased reciprocal pin for normally closing the opening of the C-shaped member.

The actuator assembly element can include a first cable guide and a second cable guide fixed to opposite outer ends of the first and second member from the aperture-forming ends, while a third cable guide can be fixed adjacent to the magnet. The actuator assembly can also have a cable fixed to one of the first or second cable guides, extending toward the opposing first or second member and extending in a second direction toward the third cable guide. The actuator assembly can have one cable guide fixed to either the first or second member and a cable fixed to the cable guide. The cable of the actuator assembly can be used as a leash if provided with a loop at the proximal end and/or a handle for grasping. The actuator assembly can be used as an adapter for a leash or can have an animal leash adapter at the proximal end of the actuator assembly. The actuator assembly can have a housing to retain the actuator cable extending from the handle to the clasp. The first member and the second member of the magnetic clasp assembly can engage with a standard D-shaped metal ring of a pet collar leash attachment. The D-shaped metal ring can have a cross-sectional area of sufficient size to enable the first and second members to encircle and lockingly engage the metal ring of the collar for attachment of the leash and can move to the closed position in response to release of the actuator cable.

BRIEF DESCRIPTION OF DRAWINGS

The description herein makes reference to the accompanying drawings wherein like reference numerals refer to like parts throughout the several views, and wherein:

FIG. 4 is a plan view of the magnetic clasp assembly of FIG. 1 in an open position;

FIG. 5 is a plan view of the magnetic clasp assembly of FIG. 2 in an open position;

FIG. 6 is a plan view of the magnetic clasp assembly of FIG. 3 in an open position;

FIG. 11 is a side view of a prior art manually operated animal leash clasp attached to a standard D-shaped metallic ring of an animal collar;

FIG. 12 is a perspective view of a prior art animal collar with a D-shaped metallic ring leash attachment;

FIG. 13 is a plan view of the magnetic clasp assembly attached to the prior art D-shaped metallic ring of FIG. 12; and FIG. 14 is a cross sectional detailed view of the magnetic clasp assembly having a cross-sectional area fitting through the prior art D-shaped metallic ring of FIG. 12.

DETAILED DESCRIPTION

Figure 1:
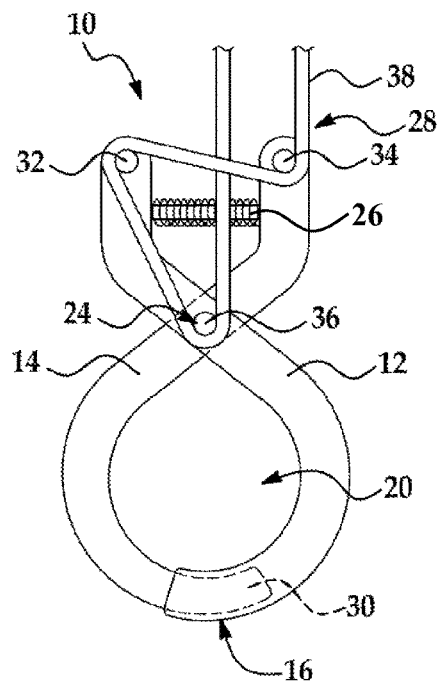
FIG. 1 is a plan view of the magnetic clasp assembly in a closed position with an overlapping configuration where one outer end of a first member sheathing engages another complementary shaped outer end of a second member.

As shown in FIGS. 1-14, a magnetic clasp assembly 10, 110, 210 includes a first member 12, 112, 212 and a second member 14, 114, 214. The two members 12, 14; 112, 114; 212, 214 are movable with respect to one another between a closed position 16, 116, 216 and an open position 18, 118, 218. The first member 12, 112, 212 and the second member 14, 114, 214 are able to engage with an animal collar leash attachment 52, such as a D-shaped metallic ring, with the aid of a magnet 24, 124, 224 to attract the assembly 10, 110, 210 to the collar leash attachment 52.

Referring now to FIGS. 1 and 4, a magnetic clasp animal leash assembly 10 can include a first member 12 and a second member 14 movable with respect to one another between a closed position 16 and an open position 18. An aperture 20 can be created or defined by an internal surface extending between the first member 12 and the second member 14. In the open position 18, the outer ends of the first member 12 and the second member 14 are spaced from one another creating a clear passage 22 into the aperture defined by the internal surface to enable a metallic leash attachment ring to engage with the first and second members 12, 14. A magnet 24 can be located opposite from the clear passage 22 and proximate to the internal surface of the aperture 20. A biasing member 26 can further be provided, if desired, for biasing the first member 12 and the second member 14 normally toward the closed position 16. An actuator assembly 28 can engage with the first member 12 and the second member 14 for driving the first and second members 12, 14 toward the open position 18. The actuator assembly 28 can also engage with the first member 12 and the second member 14 for driving the first and second members 12, 14 26 toward the closed position 16. The magnetic 24 can be formed as a magnetic pivot pin 24 for connecting the first member 12 and the second member 14 with respect to one another as a pivot joint. By way of example and not limitation, as illustrated in FIGS. 1 and 4, the first member 12 can have a tubular aperture 30 extending inwardly from a distal end of complementary size and shape to receive a complementary distal end of the second member 14.

Figure 2:
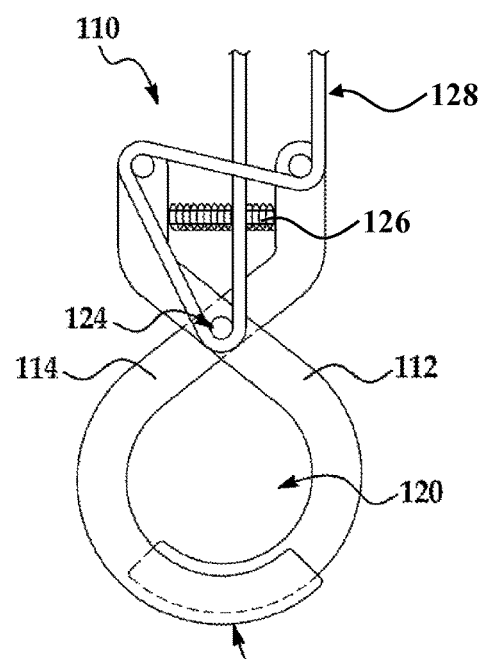
FIG. 2 is a plan view of the magnetic clasp assembly in a closed position with an overlapping configuration with an external surface of an outer arcuate end of a first member engaging another external surface of a complementary shaped outer arcuate end of a second member.

Referring now to FIGS. 2 and 5, a magnetic clasp animal leash assembly 110 can have a first member 112 and a second member 114, movable with respect to one another between a closed position 116 and an open position 118. An aperture 120 can be created or defined by an internal surface extending between the first member 112 and the second member 114. In the open position 118, the outer ends of the first member 112 and the second member 114 are spaced from one another creating a clear passage 122 into the aperture defined by the internal surface to enable a metallic leash attachment ring to engage with the first 112 and second member 114. A magnet 124 can be located opposite from the clear passage 122 and proximate to the internal surface of the aperture 120. A biasing member 126 can further be provided, if desired, for biasing the first member 112 and the second member 114 normally toward the closed position 116. An actuator assembly 128 can engage with the first member 112 and the second member 114 for driving the first and second members 112, 114 toward the open position 118. The actuator assembly 128 can also engage with the first member 112 and the second member 114 for driving the first and second members 112, 114 toward the closed position 116. The magnetic 124 can be formed as a magnetic pivot pin 124 for connecting the first member 112 and the second member 114 with respect to one another as a pivot joint. By way of example and not limitation, the first member 112 can include an external surface overlapping an external surface of a complementary portion of the second member 114 to create the closed position 116.

Figure 3:
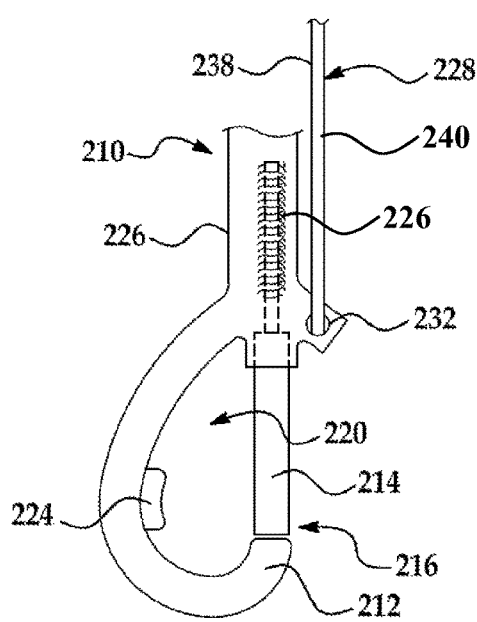
FIG. 3 is a plan view of the magnetic clasp assembly in a closed position with a spring biased, sliding bolt or snap configuration.

Referring now to FIGS. 3 and 6, a magnetic clasp animal leash assembly 210 can include a first member 212 and a second member 214 movable with respect to one another between a closed position 216 and an open position 218. An aperture 220 can be created or defined by an internal surface extending between the first member 212 and the second member 214 in the closed position 216. In the open position 218, the outer ends of the first member 212 and the second member 214 are spaced from one another creating a clear passage 222 into the aperture defined by the internal surface to enable a metallic leash attachment ring to engage with the first and second member 212, 214. A magnet 224 can be located opposite the clear passage 222 and proximate to the internal surface of the aperture 220. A biasing member 226 can further be provided, if desired, for biasing the first member 212 and the second member 214 normally toward the closed position 216. An actuator assembly 228 can engage with the first member 212 and the second member 214 for driving the first and second members 212, 214 toward the open position 218. The actuator assembly 228 can also engage with the first member 212 and the second member 214 for driving the first and second members 212, 214 toward the closed position 216. By way of example and not limitation, the first member 212 can include a generally U-shaped or C-shaped arcuate portion with an aperture extending from one leg directed toward an opposite leg for receiving the second member 214 formed as a sliding bolt or pin for movement between the closed position 216 and the open position 218.

The actuator assembly 28, 128 in the clasping animal leash assembly 10, 110 embodied in FIGS. 1, 2, 4, and 5 can include a first cable guide 32 and a second cable guide 34 fixed to each proximal end of the first member 12 and the second member 14. The third cable guide 36 is fixed at the magnetic pivot joint 24, 124 of the first 12 and second members 14. A cable 40 is fixed to one of the first and second cable guides 32, 34 extending in a direction toward one of the first and second members 12, 14 fixed at the second cable guide 34 and extending in a second direction toward the pivot joint 24, 124 fixed at the third cable guide 36.

Figure 7:
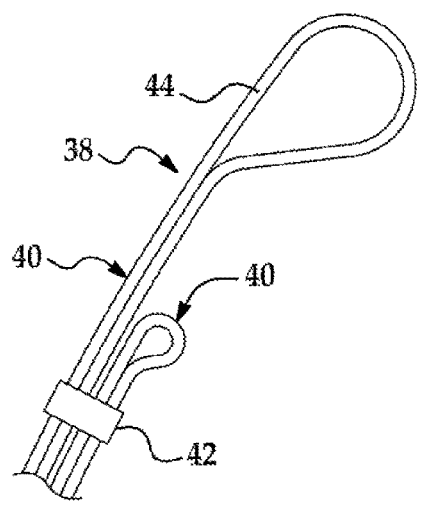
FIG. 7 is a side view of a proximal end of an actuator assembly of the magnetic clasp assembly showing handles formed by cable loops.
Figure 8:
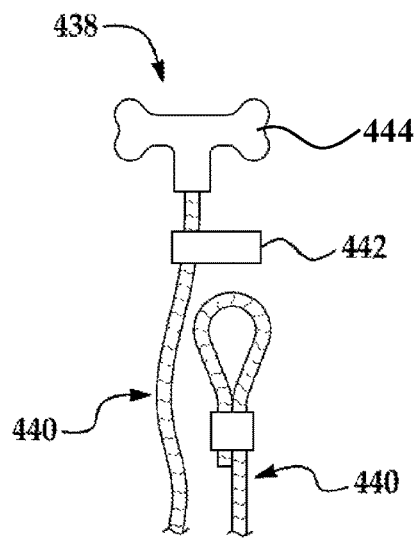
FIG. 8 is a side view of a proximal end of an actuator assembly of the magnetic clasp assembly showing a grasping handle at the end of the cable.
Figure 9:
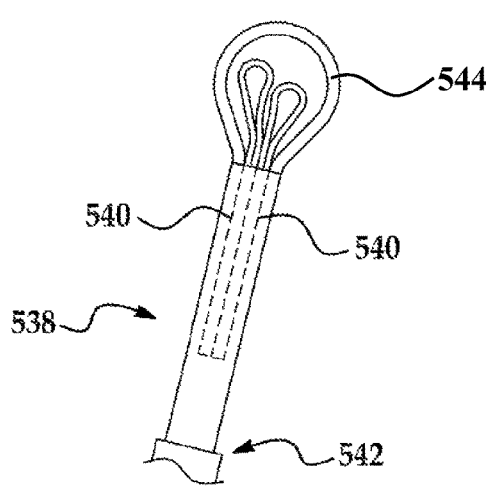
FIG. 9 is a side view of a proximal end of an actuator assembly of the magnetic clasp assembly with the actuator assembly fully housed having outer ends of the actuator assembly exposed.
Figure 10:
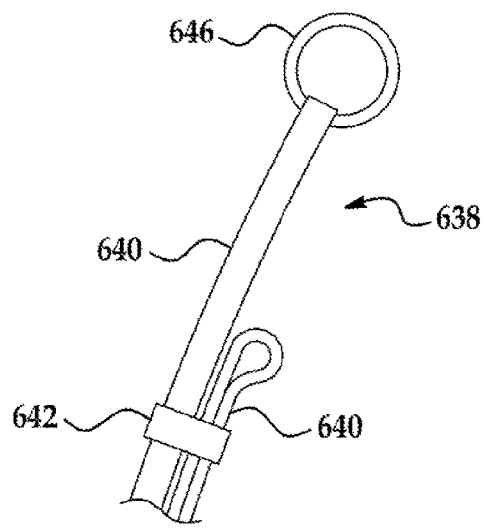
FIG. 10 is a side view of the actuator assembly with an adapter allowing attachment to an existing animal leash.

The actuator assembly 28 can include a housing assembly 42, 442, 542, 642 to retain the cable. The housing assembly can either be a small clamp or housing 42, 442, 642 to retain the cable (as best seen in FIGS. 7, 8 and 10), or can be a full housing assembly to sheath and retain a majority of a cable length 542 (as best seen in FIG. 9). When one end of the cable 40, 240, 440, 540, 640 is pulled on, the cable will drive the first and second members 12, 112, 14, 114 toward the open position 18, 118. When the opposing end of the cable is pulled on, the cable will drive the first and second members toward the closed position (16, 116).

The actuator assembly 228 in the clasping animal leash assembly 210, embodied in FIGS. 3 and 6 is a snap configuration including a cable guide 232 fixed to the proximal end of one of the first and second members 212, 214 and cable 240 fixed to the cable guide 232. When tension is applied to the cable 240, the cable will urge the first 212 and second members 214 toward the open position 218. When tension is released from the cable 240, the cable will drive the first 212 and second members 214 toward the closed position 216. To enable the actuator assembly 28, 228 to be used as a leash, the proximal end of the cable 38, 238, 438, 538 can include either a loop 44 created by the cable for holding by a handler, a handle 444 to be grasped by a handler, or a handle 544 created by the housing 542 to be held by a handler. To enable the actuator assembly 28, 228 to be used in conjunction with a prior art animal leash 648, the actuator assembly 28, 228 can have a leash adapter 646, such as an O-ring, to allow for a leash clasp 648 to engage to the cable 640 at one end with an actuator assembly 28, 128 at an opposite end of the cable 640.

The clasping animal leash assembly 10, 110, 210 will attach hands-free to a metallic pet collar leash attachment on a pet collar 52, such as a D-ring, O-ring or other eyelet, by first using the actuator assembly 28, 128, 228 to move the clasp assembly 10, 110, 210 to the open position 18, 118, 218, then placing the clasp 10, 110, 210 within a close proximity of a few inches to the pet collar leash attachment 52. The magnet 24, 124, 224 will attract the clasp assembly 10, 110, 210 to the pet collar leash attachment 52 and hold the two pieces together. The user can then use the actuator assembly 28, 128, 228 to move the clasp assembly 10, 110, 210 into the closed position 16, 116, 216. For the clasp assembly 10, 110, 210 to lockingly engage the metallic animal collar leash attachment 52 from an animal collar 50 in the closed position 16, 116, 216, the first member 12, 112, 212 and the second member 14, 114, 214 can be provided with a cross-sectional area 54 sized to fit in the aperture 56 of the leash attachment 52.

The cable 40, 240, 340, 540, 640 of the actuator assembly 28, 228 can be made of nylon or other material to withstand the tension created by an animal pulling on the clasping assembly 10, 110, 210. The terms "pet collar" and "animal collar" can be used interchangeably herein to mean a collar for an animal. The terms "pet leash" and "animal leash" can be used interchangeably herein to mean a leash for an animal.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A clasping animal leash assembly for connecting to an animal collar having at least one metallic leash attachment ring defining an aperture, the assembly comprising:
   a first member and a second member moveable with respect to one another between a closed position with the first member and the second member having an internal surface creating an aperture in a closed state therebetween and an open position with outer ends of the first member and the second member spaced from one another creating a clear passage with respect to the internal surface defining the aperture in an opened state;
   a magnet located opposite from the clear passage and proximate to the internal surface of the aperture; and
   an actuator assembly engageable with the first member and the second member to drive the first and second members toward the open position, wherein the actuator assembly further comprises
   a first cable guide and a second cable guide fixed to each proximal end of the first member and the second member respectively;
   a third cable guide fixed at the magnetic pivot joint of the first and second members; and
   a cable fixed to one of the first and second cable guides extending in a first direction toward one of the first and second members fixed at the second cable guide and extending in a second direction toward the pivot joint fixed at the third cable guide.

2. The assembly of claim 1 further comprising:
   a housing assembly to retain the cable.

3. A magnetic clasping assembly for facilitating attachment of an animal leash to a metallic animal collar leash attachment defining an aperture comprising:
   a first member and a second member moveable with respect to one another between a closed position with the first member and the second member having an internal surface creating an aperture in a closed state therebetween and an open position with outer ends of the first member and the second member spaced from one another creating a clear passage with respect to the internal surface defining the aperture in an opened state;
   a magnet located opposite from the clear passage and proximate to the internal surface of the aperture; and
   a cable-driven actuator assembly engageable with the first member and the second member to drive the first and second members toward the open position wherein the actuator assembly further comprises
   a first cable guide and second cable guide fixed to each proximal end of the first and second members, respectively;
   a third cable guide fixed at the pivot joint of the first and second members; and
   a cable fixed to one of the first and second cable guides extending in a first direction toward one of the first and second members fixed at the second cable guide and extending in a second direction toward the pivot joint fixed at the third cable guide.

* * * * *